Nov. 12, 1940.  R. F. PEO ET AL  2,221,199
TRANSMISSION CONTROL SYSTEM AND MECHANISM
Filed June 25, 1938  8 Sheets-Sheet 7
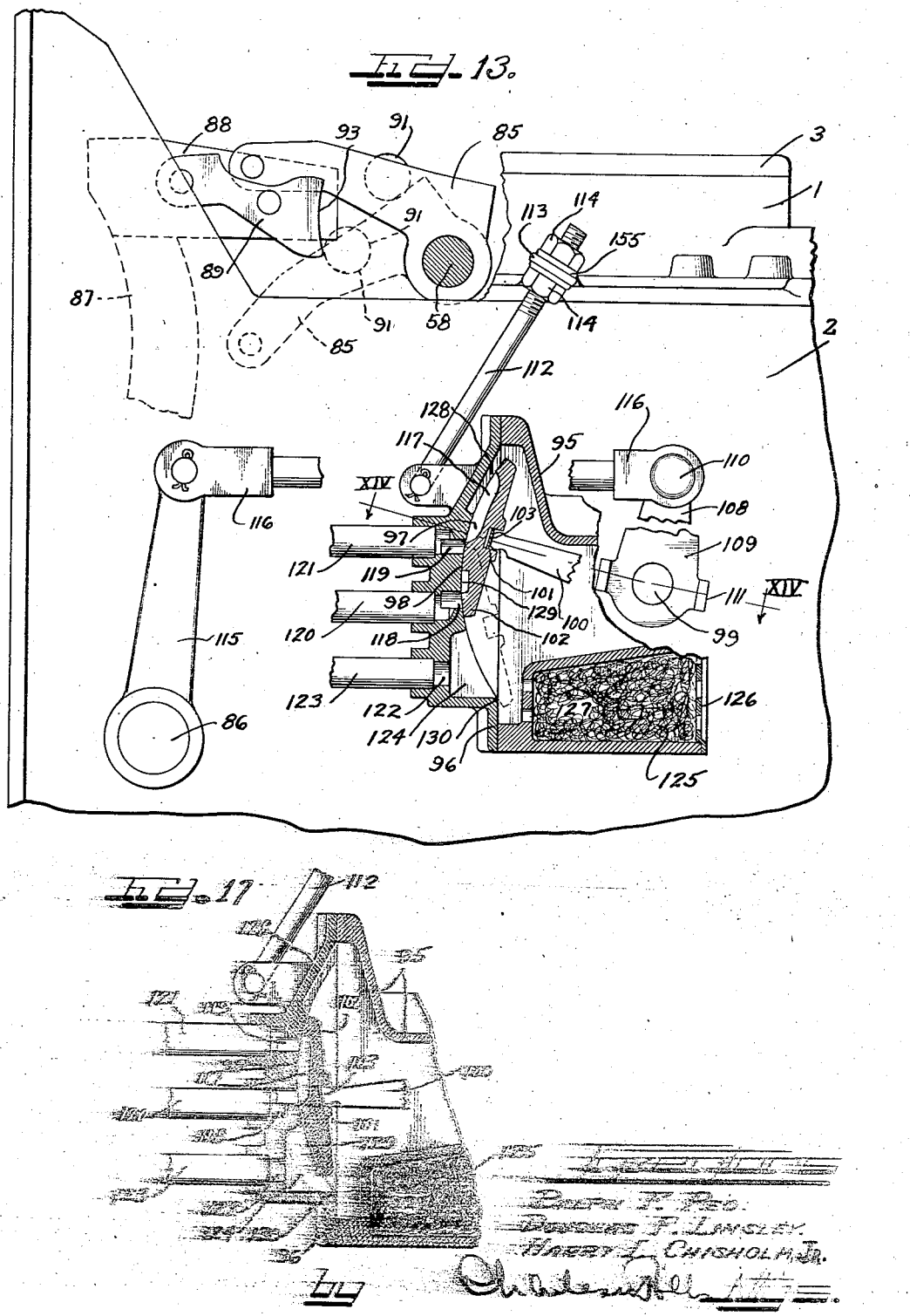

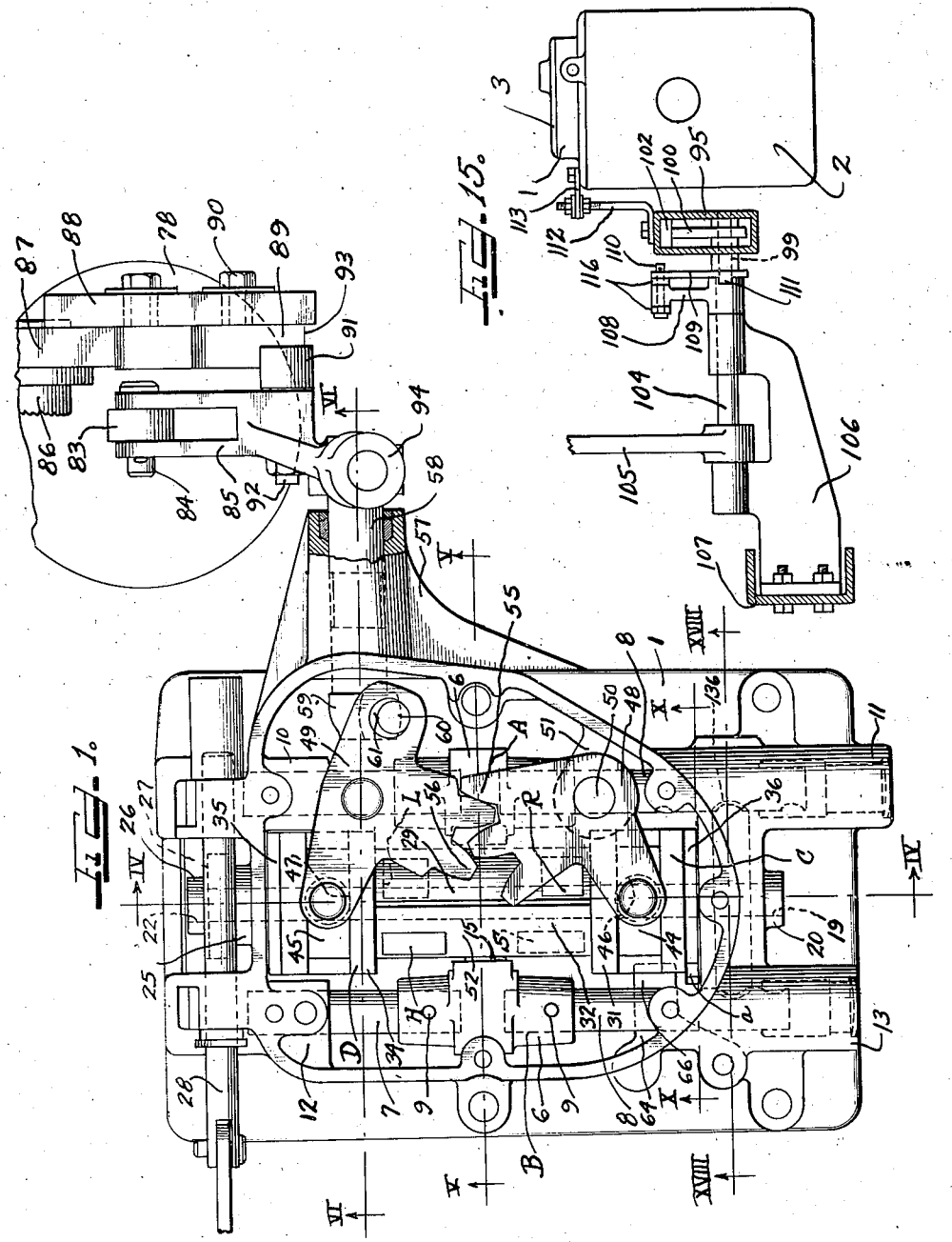

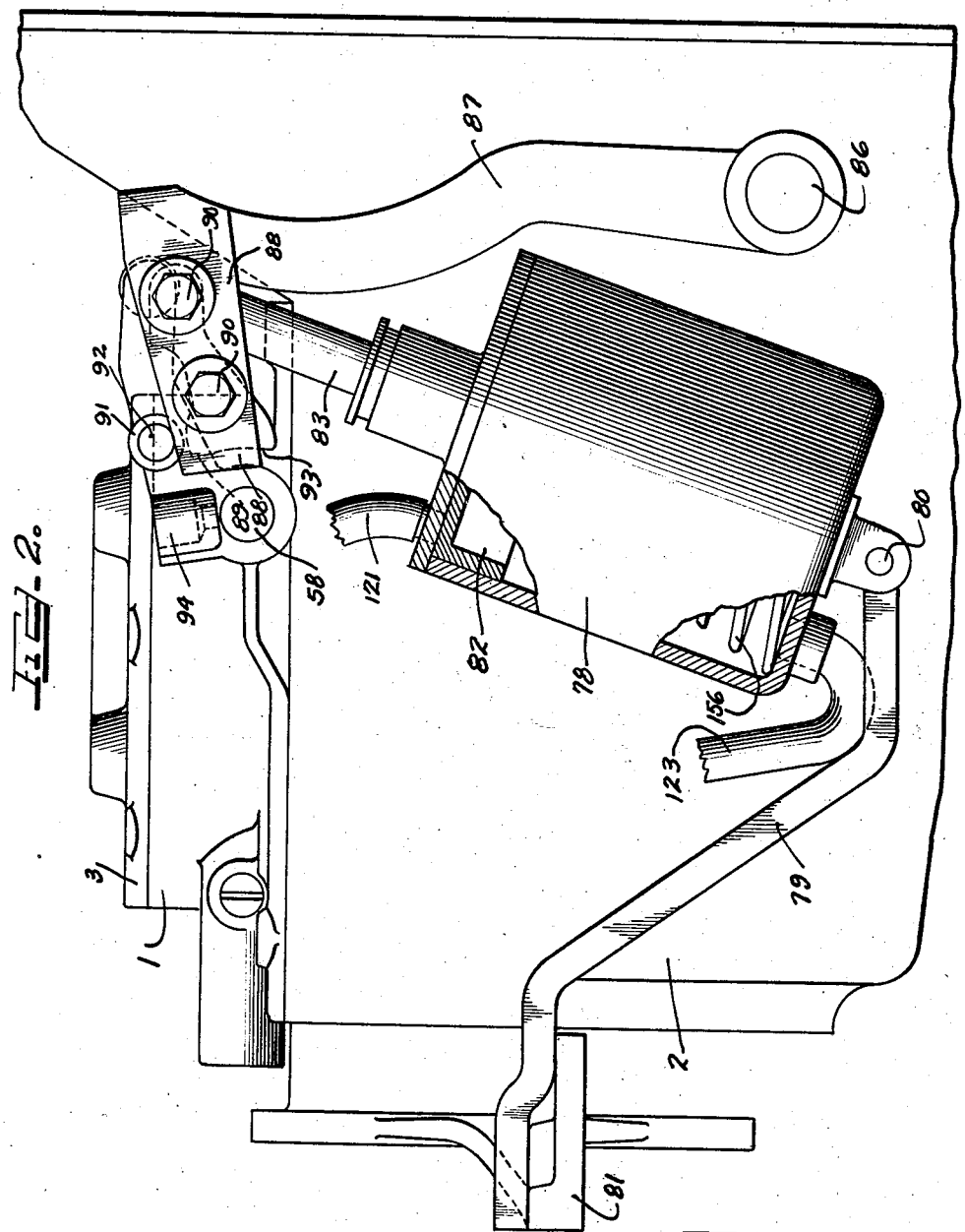

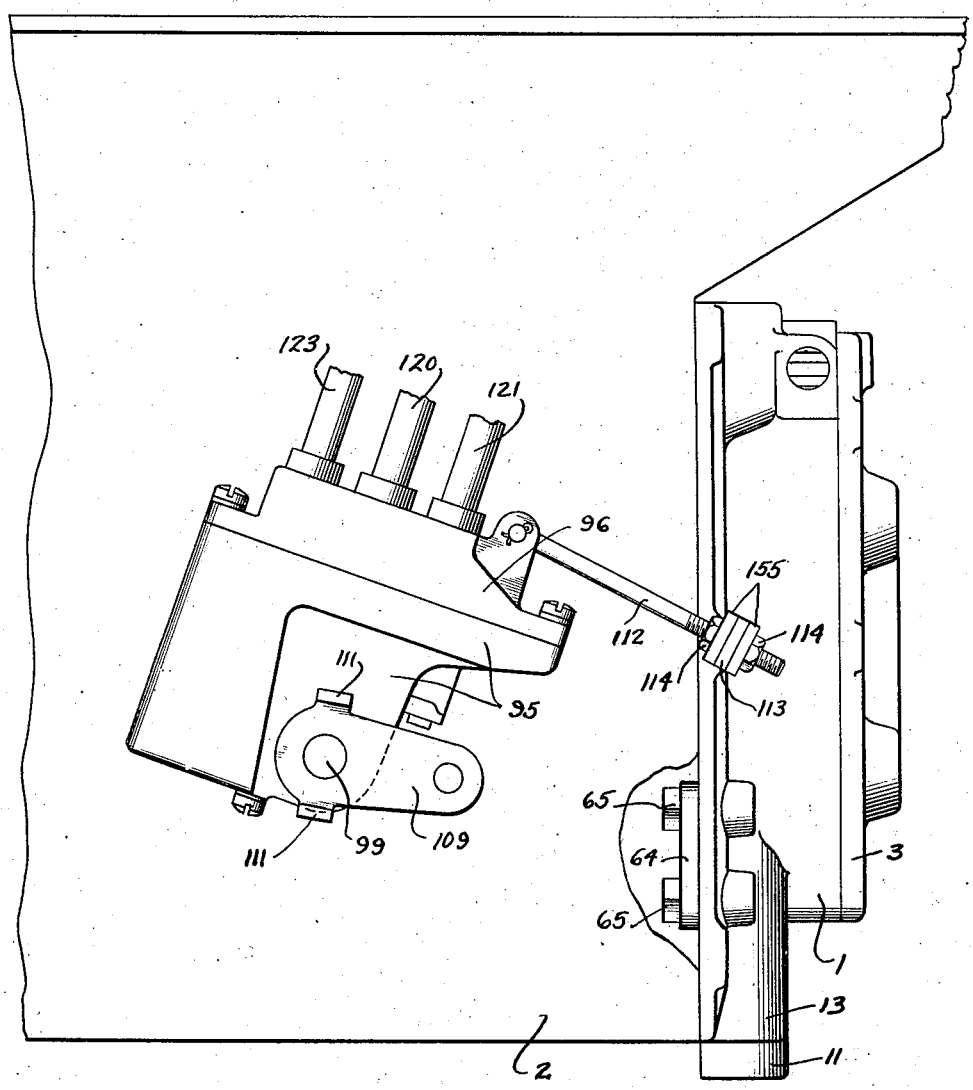

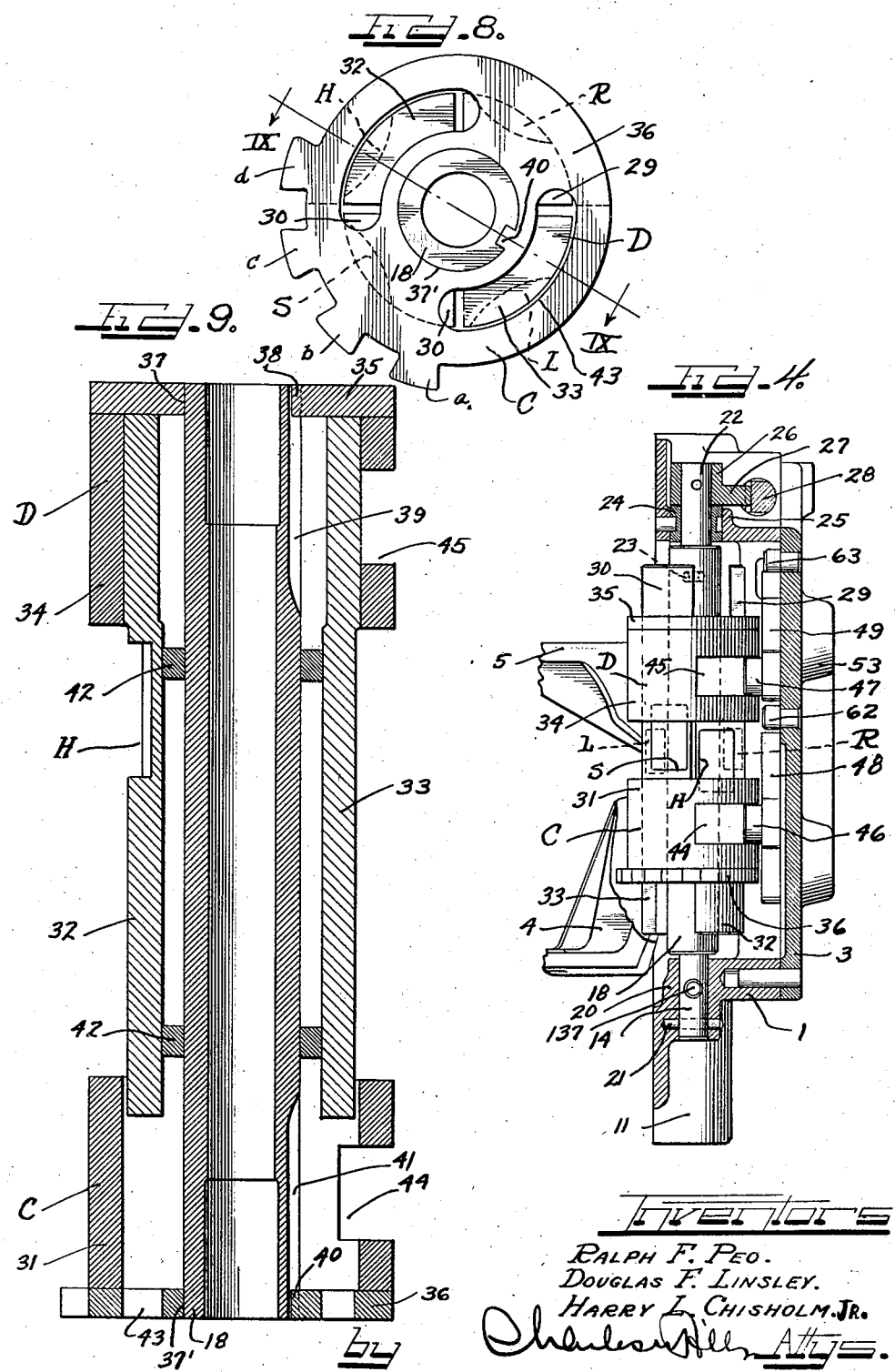

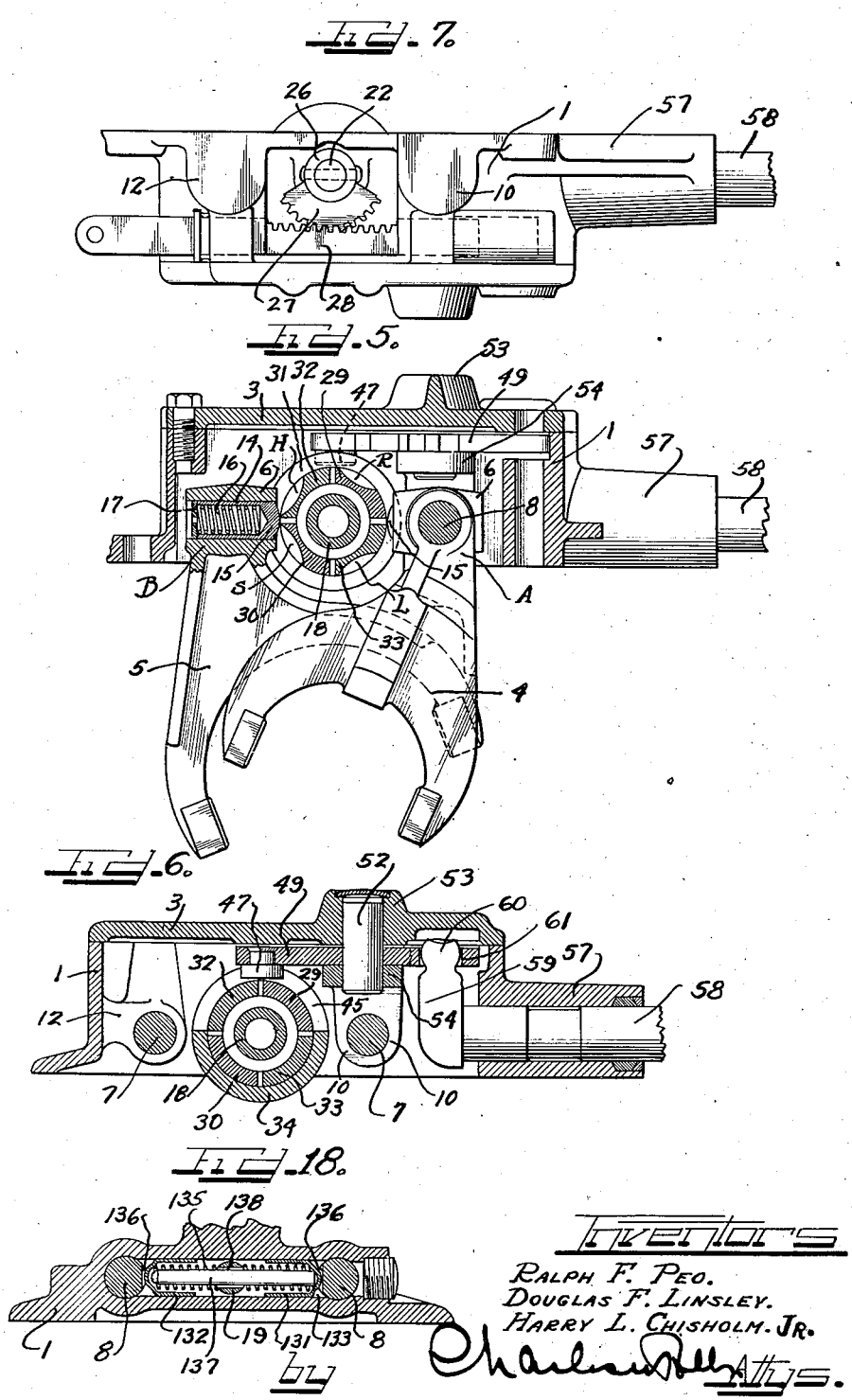

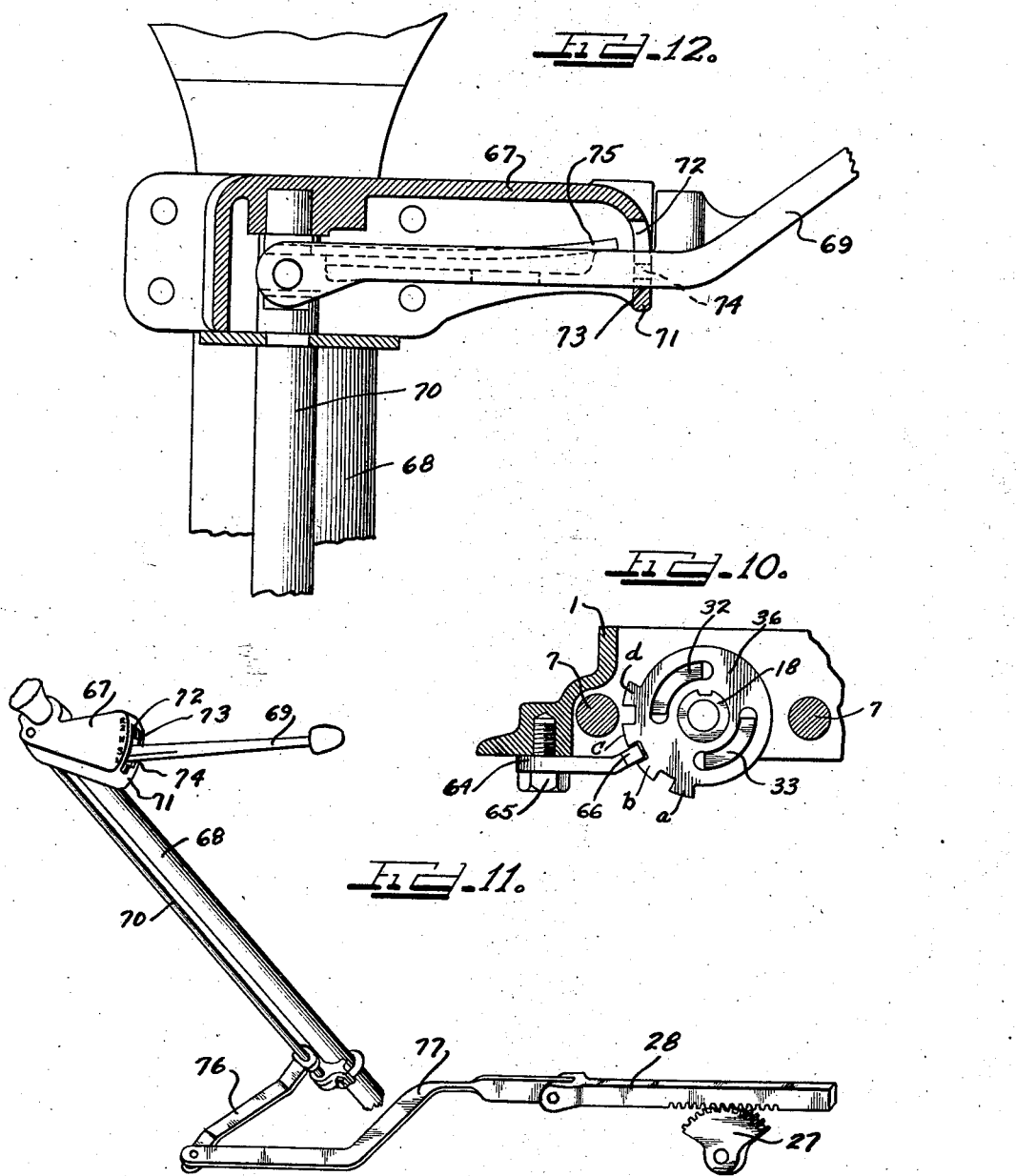

Nov. 12, 1940.    R. F. PEO ET AL    2,221,199
TRANSMISSION CONTROL SYSTEM AND MECHANISM
Filed June 25, 1938    8 Sheets-Sheet 8
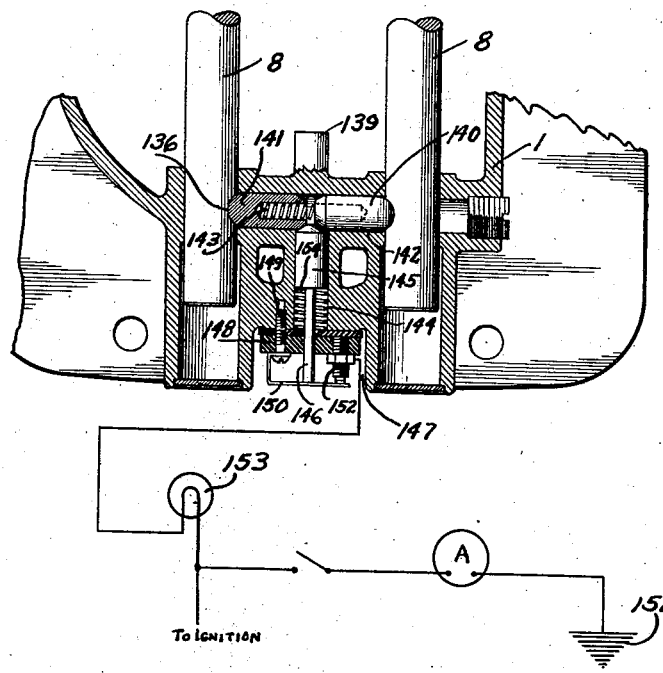
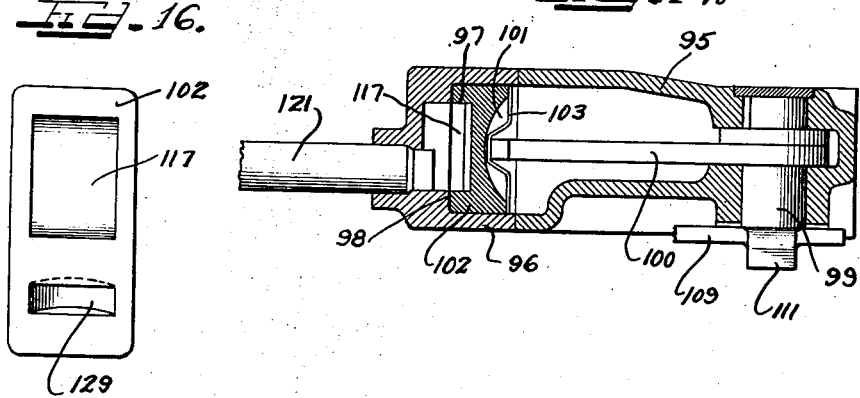
Inventors
Ralph F. Peo.
Douglas F. Linsley.
Harry L. Chisholm, Jr.
by Charles Miller Attys.

Patented Nov. 12, 1940

2,221,199

UNITED STATES PATENT OFFICE 2,221,199

TRANSMISSION CONTROL SYSTEM AND MECHANISM

Ralph F. Peo, Harry L. Chisholm, Jr., and Douglas F. Linsley, Buffalo, N. Y., assignors to Houde Engineering Corporation, Buffalo, N. Y., a corporation of New York Application June 25, 1938, Serial No. 215,776

4 Claims. (Cl. 192—3.5)

This invention relates to transmission control in automotive vehicles and particularly to that type of control in which selection of the desired transmission speed is effected by a selection lever preferably located adjacent to the steering wheel, and the shifting of the selected transmission gearing is effected by power means whose operation is under control of the clutch controlling pedal, the general object of the invention being to provide improved and simplified construction and operation for the cooperating elements of the control system and more efficient cooperation of the various elements.

An important object of the invention is to simplify the construction and cooperation of the selection and shift controlling parts located within the transmission housing so that these elements may be more economically manufactured and assembled.

A further object of the invention is to provide a comparatively small but powerful vacuum operated cylinder structure so arranged and controlled that a full stroke of the piston structure will effect setting of the transmission gearing to neutral position, and a full stroke of the piston structure will effect shifting of the selected gears, and with the cylinder structure yieldably mounted so that the selection and shifting structure operated thereby will not be strained.

Another important object is to provide simplified and efficiently operable valve structure for controlling the application of the engine vacuum to the cylinder and for venting the cylinder to atmosphere, and with the valve mechanism connected with the clutch controlling lever for operation thereby.

Another object of the invention is to provide simplified construction of the selection lever assembly at the steering wheel and connection thereof with the selector element in the transmission casing.

A further object is to provide safety means for assuring complete operations in a series of operations, one of such safety means being in the form of positive locking means for preventing shifting unless the shift selectors have been moved into a definite indexed position, and also for preventing selection unless the selectors are longitudinally fully in the neutral or "in gear" position.

A further object is to provide safety means in the form of blocker mechanisms which will prevent the clutch pedal from return to clutching engagement until such time as the power cylinder has actually made the selected shift, so that shifting is impossible, unless the clutch is fully disengaged.

Another important object is to provide simplified means by which shifting for any direction or speed may be accomplished manually in case of vacuum failure or at times when the engine is not running.

Still another object is to provide a signal or indicating means for the driver of a vehicle, automatically controlled by the position of the transmission gearing for indicating when the gears are in neutral, such signal being especially useful when starting the vehicle engine or when the vehicle is left standing with the engine running.

The various features enumerated above and other features of construction, arrangement, and operation are incorporated in the structure disclosed on the drawings, in which drawings:

Figure 1 is a plan view of the selector and shifter elements enclosing casing, with the cover removed;

Figure 2 is a right side elevation of the transmission housing and the selector and shifter casing;

Figure 3 is a left side elevation of the housing and casing;

Figure 4 is a section on plane IV—IV of Figure 1;

Figure 5 is a section on plane V—V of Figure 1;

Figure 6 is a section on plane VI—VI of Figure 1;

Figure 7 is a front end view of the casing;

Figure 8 is a rear end view of the selector elements assembly;

Figure 9 is a section on plane IX—IX of Figure 8;

Figure 10 is a section on plane X—X of Figure 1;

Figure 11 is a perspective view of the selector lever assembly and the connection with the selector elements;

Figure 12 is a vertical section of the selector lever assembly;

Figure 13 is a left side elevation of the transmission housing, and the valve structure in vertical section;

Figure 14 is a horizontal section of the valve structure on plane XIV—XIV of Figure 13;

Figure 15 is a rear elevation of the transmission housing and showing the connection of the valve structure with the clutch pedal shaft;

Figure 16 is an outer side view of the valve;

Figure 17 is a view of the valve structure showing the valve in an intermediate position;

Figure 18 is a section on plane XVIII—XVIII of Figure 1;

Figure 19 is a plan view, partly in section, showing a modified interlocking arrangement for the shift elements and a signal circuit controlled thereby.

The selector and shift elements are contained within a cap or casing 1 which is substituted for the cover for the conventional gear casing 2 from which the shift lever extends upwardly from the floor of the car. The top casing or cap 1 has a cover 3 which is removable so that access may be had to the various operating parts.

Extending parallelly and longitudinally in the casing 1 along the sides thereof are the shifter elements A and B, the structure A supporting the shifter fork 4 for shifting for reverse drive or low speed, and the structure B supporting the shifter fork 5 for second speed and high speed. The shifter structures are substantially alike, each comprising a body or hub part 6 from which rods or bars 7 and 8 extend respectively forwardly and rearwardly in axial alignment, the body 6 being preferably bored to receive the rods and with the rods rigidly secured in the bores as by pins 9. The bars 7 and 8 of the shifter structure A engage at their outer ends in bosses 10 and 11 on the casing 1, and the bars for the shifter structure B engage at their outer ends in bosses 12 and 13, so that the shifter structures may be shifted longitudinally in either direction and relative to each other.

The body 6 of each shifter structure has a cross passage 14 preferably of rectangular cross section for guiding a coupling plunger 15 for cooperation with the selector elements in a manner to be described later. Each plunger is hollow for reception of a spring 16 interposed between the plunger head and washer or plate 17 seated in the outer end of the passageway 14, the springs tending to shift the plungers horizontally inwardly relative to the casing 1.

The selector assembly comprises cooperating selector elements C and D. Referring particularly to Figures 1, 4, 5, 6, 8, and 9, the selector members are mounted on a cylindrical tube 18 parallel with and disposed midway between the shifter elements A and B. Referring to Figures 1 and 4, the tube at its front end is journalled on a shaft 19 extending rearwardly from and secured in a boss 20 of the casing 1 as by means of a pin 21. At its rear end the tube has secured therein a drive shaft 22 secured to the tube as by a pin 23, the shaft being journalled in a bushing 24 secured in the boss 25 extending from the rear wall of the casing 1. Outside of the bushing a hub 26 is pinned to the shaft 22, and from this hub extends a gear segment 27 which is meshed by teeth on a rack bar 28 which may be moved transversely on the casing 1 at the rear end thereof so that the sector supporting tube may be rotated, the movement of the rack bar being controlled by the selector lever located at the steering wheel, as will be later explained, the tube being rotatable but not axially shiftable.

The selector element C comprises diametrically opposite fingers 29 and 30, each of which is substantially a quarter section of a cylindrical shell, and these fingers are supported and held in alignment by a collar 31, the securing being preferably by welding.

The selector element D comprises similar diametrically opposite fingers 32 and 33 surrounded at their outer ends by the supporting collar 34 preferably welded thereto. Abutting the outer ends of fingers 32 and 33 and the collar 34 is an end plate 35 preferably welded to the collar and fingers, this end plate being concentric with the collar and fingers. An end plate 36 engages the outer ends of the fingers 29 and 30 and the collar 31 and is secured thereto as by welding. The end plates 35 and 36 have respectively the openings 37 and 37', for receiving the respective ends of the tube 18. The end plate 35 has a projection or key 38 extending therefrom into a longitudinally extending keyway 39 in the respective end of the tube 18, and the end plate 36 has a tooth or key extension 40 engaging in the longitudinally extending guideway 41 in the corresponding end of the tube, so that the selector members C and D may be shifted axially on the tube but must rotate therewith. Spacing collars 42 are provided between the selector elements and the tube which serve to hold the fingers of the selectors concentric with the tube.

As the selector elements C and D shift axially toward or away from each other, the ends of the fingers of each element are within the supporting collar of the other element, and between the collars the finger quadrants complete a cylindrical shell with which the coupling plungers 15 of the shift structures A and B cooperate. The end plates 35 and 36 of the selector elements are provided with arcuate passageways 43 through which the ends of the fingers may pass as the selector elements are shifted to their inner position, as shown on Figure 4.

The collars 31 and 34 of the selector elements have circumferentially extending slots 44 and 45 respectively for receiving abutment lugs or rollers 46 and 47 on levers 48 and 49. The lever 48 has a pin 50 extending therefrom to journal in a boss 51 extending from the side wall of the casing 1, and the lever 49 is fulcrumed by a pin 52 journalled at its upper end in a boss 53 forming part of the cover 3 for the casing 1, the lower end of the pin being journalled in a shelf 54 extending from the boss 10 on the casing 1 (Figure 6).

The levers 48 and 49 have intermeshing teeth 55 and 56 respectively so that the levers must always swing together. Extending laterally to the right from the casing 1 is a boss 57 which journals a shaft 58 terminating in the casing in a crank arm 59 having a spherical head 60 engaging in the opening 61 in the outer end of the lever 49, so that when the shaft 58 is oscillated the levers will be swung to shift the selector elements C and D to their outer positions as shown in Figure 1, or to their inner positions as shown in Figure 4, a stop pin 62 extending down from the cover 3 limiting the inward swing of the levers and thereby the inward shift of the selector elements.

Another pin 63 extending from the cover 3 is engageable by the lever 49 to limit the outward swing of the levers and thereby the outward shift of the selector elements, the pins 62 and 63 being clearly shown on Figure 4.

Referring particularly to Figures 1, 4, and 5, the finger 29 of the selector element C has a coupling notch R adjacent to the collar 31, the notch extending in circumferential direction from adjacent to the upper edge of the finger to about midway between the finger edges, this notch being for selection of the transmission for reverse drive. The opposite finger 30 of the selector element C has the notch S of the same circumferential extent as the notch R and terminating close to the upper edge of the finger 30, this notch being for selection for second speed, the notch S being adjacent the collar 31.

The finger 32 of the selector element D has the notch H beginning at the lower edge of the finger, and this notch is for selection of high speed, the notch being adjacent to the collar 34 of the selector element. The opposite finger 33 of the element D has the notch L extending from adjacent the lower edge of the finger and being adjacent to the collar 34, and this notch is for selection of low speed.

When the selector elements are in their inner position as shown in Figure 4, all of the notches will be in a common circumferentially extending coupling field for selective reception of the coupling plungers in the shifter elements A and B. The notches are of a width to readily receive the square plungers, their sides being in radial planes and their bottoms being concave, while the outer faces of the plungers are rounded, the plungers thus readily entering the notches and being cammed out of the notches upon rotation of the selector elements.

Referring to Figure 5, the selector elements are shown in neutral position, all of the slots being displaced from the coupling plungers, the coupling plunger for the shifter structure A engaging the selector finger assembly at the gap between the fingers 29 and 33, and the plunger for the shifter structure B engaging at the gap between the fingers 30 and 32. The selection for the desired speed is made by the rotation of the selector element assembly, the rack bar 28 whose movement is controlled by the selector lever at the steering wheel determining the direction and degree of rotation. If, for example, low speed is desired, the selector lever will be operated to effect counter clockwise turning (Figure 5) of the selector structure to bring the low speed notch L into axial alignment with the coupling plunger 15 of the shifter structure A. If the selector elements C and D are in their inner position as shown in Figure 4, the plunger will enter the notch when the selector assembly is turned. If the selector elements are in their outer position as shown in Figure 1, when selection is made, inward shift of the selectors will bring the four notches into the common coupling field, and the coupling plunger of the element A will then be received in the low speed notch L, and when this coupling connection is made, the coupling plunger 15 of the shift structure B will be in engagement with the cylindrical outer surface of the finger 32. If the selector elements are now shifted to their outer position, the shifter structure A coupled to the selector element D will be shifted for setting of the transmission for low speed drive. If the selection had been made for reverse drive, the coupling plunger of the shifter structure A would be in the reverse notch R of the selector structure C, and outward shift of the selector element would then have shifted the shifter structure A for setting of the transmission for reverse drive.

For second or high speed, the selector element assembly will be rotated in the corresponding directions for reception of the coupling plunger of shift structure B in the desired speed notch followed by shifting of the gearing for the selected speed when the selector elements are shifted outwardly.

The laterally inner ends of the bodies 6 of the shifter structures A and B project a distance into the paths of the collars 31 and 34 of the selector elements so that when the selector elements are shifted to their inner position the collars will engage the bodies 6 and bring the shifter structures A and B to neutral position before the selector elements are shifted apart for shift of the coupled shifter element. Thus before shifting is accomplished, the transmission is first set to neutral.

It is very important that the selectors be properly rotationally set in definitely indexed or coupling position before shifting can be accomplished in order that jamming or injury to the parts may be prevented, and it is also important to prevent selecting until the selectors are longitudinally and fully in either the neutral or "in-gear" position. We have therefore provided safety lock mechanism which is most clearly shown in Figures 1, 3, 8 and 10. On the end disc 36 of the selector assembly teeth a, b, c, and d are provided, spaced 30° apart to correspond with the circumferential spacing of the selector notches which are spaced apart 30° or a multiple thereof. An index plate or key 64 may be conveniently secured to the bottom of the casing 1 as by screws 65, the end 66 of the key projecting into the path of the end plate 36. The spacing between the teeth is such that if proper selection has been made by the proper degree of rotation of the selector structure, the corresponding tooth spacing will be in alignment with the index end 66 so that the selector elements may be shifted for shifting of the corresponding shift structure, but if proper selection has not been made, a tooth will strike the index plate and prevent shifting, this being true whether selection is made while the selectors are in neutral position, as shown in Figure 4, or in shifted position as shown in Figure 1. Also, if the selector elements C and D have not been fully shifted to either neutral or "in-gear" position, the index plate end 66 will still be in one of the tooth spacings, and selection can therefore not be made until the selectors have been fully shifted in either direction for complete withdrawal of the tooth and end plate 36 from the index plate end. Figure 10 shows the space between teeth b and c in alignment with the index end 66, this being the neutral position of the selector element as shown in Figures 1 and 5. The selector element may therefore be shifted axially. If the proper and complete selection setting has been made for any of the speeds, the corresponding space between teeth or outside of the end teeth will be in proper alignment with the index plate end and shifting may be accomplished. The index plate end 66 may be rounded at its edges so that it will readily receive the tooth spacings, and if the rotational selection setting of the selector elements is only slightly incomplete, upon subsequent axial shifting of the elements, the rounded surfaces of the index end will cam the selector elements rotationally into complete setting position. The locking means thus assures safety and prevents jamming or injury to the parts by requiring complete movement of the selector element in one direction before movement thereof in another direction.

Any suitable selector lever assembly may be provided, preferably adjacent to the steering wheel of a vehicle, and any suitable means may be provided for connecting the selection lever with the rack bar 28 for selection operation of the selector element. Figures 11 and 12 show an arrangement which might be used. A selection lever casing 67 is clamped to the steering column 68 of a vehicle, the selection lever 69 extending into the casing and being pivoted to the upper end of a rod 70, so that the lever may swing vertically independently of the rod and to turn the rod when the lever is swung laterally. The end wall 71 of the casing through which the lever projects has upper and lower slots 72 and 73 connected by a cross slot 74 midway of their ends. A suitable spring 75 tends to press the lever down. The lever can be swung vertically from one horizontally extending slot to the other by first swinging the lever laterally into registration with the cross or vertical slot 74, the lever when in registration with this cross slot being in position corresponding with neutral setting of the selector element as shown in Figure 5. If reverse or low speed setting is desired, the lever is swung upwardly through the neutral slot into the upper horizontal slot 72 and then is swung laterally for setting for either low or reverse transmission. If either high or second speed is desired, the lever is shifted through the neutral slot into the lower horizontal slot 73 and then swung laterally for selection for either the second or high speed.

The rod 70 at its lower end has an arm 76 extending therefrom connected by linkage 77 with the rack bar 28 so that when the rod is rotated by the selection lever, the rack bar will be longitudinally shifted for rotation of the selector element assembly. The distance that the selection lever 69 may be swung in the upper slot 72 in either direction from the neutral setting is twice as long as the distance in which the lever may be swung laterally in the lower slot 73 in either direction from neutral setting. In the arrangement shown in Figure 11, the lever 76 is of such length that the rack bar 28 and gear 27 will effect rotation of the selector assembly through 30° or a multiple thereof depending upon the slot in which the selection lever 69 is laterally swung, and if the lever has been swung the full distance in either slot, the selector elements will have rotated the full distance for the shifting operation, but if the selection lever has not been fully set, the locking mechanism referred to hereinbefore will prevent shifting.

Describing now the power means for performing the shifting, the power cylinder 78 is located in the vehicle at the right of the transmission housing body 2 and below the end of the power shaft 58, the axis of the cylinder extending downwardly. The cylinder is supported by an arm 79 pivoted at its forward end to the bottom of the cylinder as indicated at 80 so that the cylinder may swing forwardly and rearwardly, the arm 79 at its rear end being supported by and secured to a bracket structure 81 provided on the rearward end of the transmission housing 2, the supporting arm being preferably springy or yieldable to prevent undue stressing and straining of the parts operated by the cylinder structure.

The piston 82 within the cylinder has the piston rod 83 extending therefrom which receives at its upper end the pin 84 extending through the clevis end of the lever arm 85 secured to the outer end of the power shaft 58. The arrangement is such that when the piston is moved to the upper end of the cylinder the arm 85 will be swung and the shaft 58 rotated for swing of the levers 48 and 49 to shift the selector elements C and D to their outer position, as shown in Figure 1, and when the piston is moved to the bottom of the cylinder, the selector elements will be shifted to their inner or neutral position shown in Figure 4.

Safety means may be provided in the form of blocker mechanism for preventing clutch engagement until such time as the power cylinder has actually completed the shift, and which also prevents shifting unless the clutch has been disengaged. The clutch shaft 86 which extends through the clutch housing forwardly of the transmission housing has secured at its right end an upwardly extending arm 87. This arm terminates at the right of the shift lever 85 and has the forward extension 88 which may be in the form of a plate welded to the arm. On the left side of the extension 88 is a cam block 89 which is adjustably secured to the plate by screws 90, this cam block being in alignment with a cam roller 91 located on the right side of the shift lever 85 and journalled and supported by a pin 92. On Figures 1 and 2, the transmission mechanism is shown in gear, and the clutch is engaged, the arm 87 being in its rearward position. The upper end of the block 89 is below and in the path of the roller 91 so that the power cylinder cannot swing the shift lever 85 downwardly while the clutch is engaged. Upon disengagement of the clutch, the block will be withdrawn and the power cylinder may swing the shift lever for shifting of the selector elements to their inner or neutral position. During such shift to the neutral position, the clutch will be disengaged and the lever 87 swung forwardly, and the roller 91 will be in front of the surface 93 of the block, and the roller will be in this position and will not release the block so that the arm 87 cannot swing for engagement of the clutch until the shift lever 85 has been operated to fully complete a shift into a selected gear. Thus, the driver cannot engage the clutch until a shift into gear is fully completed, thereby preventing missing the shift or clashing the gears. When the transmission is in gear (Figure 1) and the clutch is engaged, the upper side of the block will be below the roller so that the power cylinder cannot swing the shift lever 85 downwardly for bringing the selector elements together for the shifting operation, and therefore shifting will be impossible unless the clutch is disengaged.

In order that shifting may be accomplished should the vacuum of the engine fail or the engine is not running, a socket extension 94 is provided on the hub of the shift lever 85 into which socket a suitable bar or lever (not shown) may be inserted for manual operation of the lever and of the shift.

Describing now the valve structure and operation for controlling the flow of vacuum to the power cylinder, the location and construction of the valve is best shown on Figures 3 and 13. The valve is located on the left side of the transmission housing 2. The valve body 95 has a cover 96 provided with a valve guideway or channel 97 of rectangular cross section and with its bottom surface 98 arcuate with the center of the arc in the axis of the valve shaft 99, which extends transversely through the body 95 and has the arm 100 keyed thereto, with the end of the arm engaging in a recess 101 in the valve 102 whose outer surface is arcuate to fit the seat 98, a suitable spring 103 being interposed between the arm end and the valve for holding the valve against its seat, the recess and spring being clearly shown in Figure 14.

Figure 15 shows the arrangement of the valve structure relative to the clutch pedal lever. The shaft 104, by which the clutch lever 105 is fulcrumed, is journalled in a bearing bracket 106 usually secured to and extending from the left side beam of the vehicle chassis. Secured to and extending upwardly from the inner end of the shaft is a lever 108. The valve structure is located with its valve shaft 99 coaxial with the shaft 104, and secured to the outer end of the valve shaft is a lever 109 which extends upwardly, a pin 110 extending through the adjacent outer ends of the levers to couple them together, so that the valve lever will swing with the lever 108, and therefore the valve shaft will rotate with the clutch pedal shaft. To hold the shaft in axial alignment, the valve lever 109 is provided with outwardly extending ears 111 between which the hub of the lever 108 is received.

The valve structure is further supported and adjustable by means of a link 112 pivoted to the valve housing and extending through a bracket or clip 113 mounted on the casing 1, the end of the link being threaded for reception of lock nuts 114, so that the link may be adjusted for rotary adjustment of the valve housing and thereby effecting adjustment of the valve seat relative to the valve.

Secured on the left end of the clutch shaft 86 is an upwardly extending lever 115 which is connected by a link 116 with the lever 108 on the clutch pedal shaft 104, and the pin 110 which connects the valve lever to the lever 108 may also serve to connect the link 116 to the lever 108 (see Figure 13 and 15).

The valve 102 may be of any suitable material. Preferably it is molded of material such as is known in the art as "Durez." The material is preferably impregnated with suitable lubricant such as graphite. The valve has a port 117 in the form of a rectangular recess in the valve body (Figure 16) for cooperating with ports 118 and 119 in the valve housing cover and terminating at the valve seat, the port 118 being connected by a suitable conduit means 120 with the intake manifold of the vehicle engine, while the port 119 is connected by a suitable conduit 121 with the outer or gear shifting end of the power cylinder 78. A third port 122 through the valve housing cover is connected by a suitable conduit 123 with the inner or neutralizing end of the power cylinder, the port 122 communicating with the recess 124 in the valve housing cover outside of the plane of the valve seat.

In the valve housing body 95, outside of the valve chamber, is provided an air inlet chamber 125 closed at its outer end by a perforated lid 126 and connected at its inner end with the valve chamber by passages 127, the air chamber being preferably filled with filtering material so as to filter the air flow into the valve chamber.

In the valve housing cover a port or channel 128 extends along the valve seat, its upper end comunicating with the valve chamber and its lower end terminating a distance above the port 119.

When the valve is in its upper position as shown on Figure 13, the clutch has been engaged after a shifting operation and the vacuum port 118 is closed, the outer or shifting end of the cylinder being then open to the atmosphere, air flowing in through the air chamber 125, the valve chamber, the air passage 128, the valve port 117, the port 119, and the conduit 121 to the cylinder. The inner or neutralizing end of the cylinder will then also be open to atmosphere, the air flowing from the valve chamber through port 122 and the conduit 123 to the cylinder. Although the vacuum is shut off from the cylinder, the vacuum suction will tend to intimately hold the valve against its seat, and in order to increase this vacuum effect a recess 129 may be provided in the valve for presenting additional suction area.

Describing now the operation, suppose that the transmission is in neutral and the selector elements C and D are in their outer position as shown in Figure 1 with the piston at the outer or shifting end of the cylinder, and the clutch pedal in clutching position with the valve at the upper end of its stroke as shown in Figure 13, with both ends of the cylinder vented to atmosphere. The selector assembly is then rotated by manipulation of the selector lever at the steering wheel for selection for the desired speed. Selection could be made after or before unclutching movement of the clutch pedal. If selection is to be made after clutch disengagement, the clutch pedal is swung down to move the valve to its lower position indicated by dotted lines on Figure 13. During downward movement of the valve, it will pass through the position shown on Figure 17 during which the air port 128 will be disconnected from the outer end of the power cylinder and the cylinder will be connected through the valve port with vacuum, but as the piston is already at the outer end of the cylinder there will be no movement of the shifting mechanism. As the valve comes to its lower position, it will engage with the corner 130 or lower end of the valve seat and will shut off the recess 124 from the atmosphere, thus disconnecting the inner end of the cylinder from atmosphere, and the valve port will then connect vacuum with the recess 124, and the inner end of the cylinder will be subjected to vacuum so that the piston is drawn down for shift of the selector elements C and D to their neutralizing or inner position for reception in the selected speed notch of the corresponding coupling plunger of the shift mechanism. Now when the clutch lever is released for movement thereof to clutching position, the valve is returned to its intermediate position (Figure 17) for reconnecting the inner end of the cylinder with the atmosphere and for reconnection through the valve port of vacuum with the outer end of the cylinder so that the piston will be shifted outwardly for outward shift of the selector elements and shifting of the selected speed gear, and when the valve reaches its uppermost position (Figure 13), the outer end of the cylinder will again be connected with atmosphere and disconnected from vacuum, and the shift has been completed for the desired speed. It will be noted that when the clutch pedal is depressed for unclutching, the valve will not connect the cylinder with vacuum until the clutch has been fully disengaged.

If another speed is desired, and preselection is made therefor, the clutch pedal is depressed and the valve moved to its lower position and momentarily connecting the outer end of the cylinder with vacuum, but the piston is already in its outer position so that nothing happens, and when the valve reaches its lower position, the outer end of the cylinder will be vented and the lower end connected with vacuum for inward shift of the piston and shift of the selector elements to their inner or neutralizing position, and then when the clutch lever is released, the upward movement of the valve will disconnect the inner end of the cylinder and connect the outer end thereof with vacuum for outward shift of the piston for separation of the selector elements and effecting of shift for the selected speed, the power piston operating for such shifting before final movement of the clutch lever to clutch engagement position, both ends of the cylinder being then vented to atmosphere and the vacuum disconnected therefrom. It will be noted that the shifting of the selector element into neutralizing position or into shifting position is accomplished by the full stroke of the piston from one end of the cylinder to the other. The cylinder may, therefore, be made comparatively short and compact.

On Figure 13 is shown the transmission shift lever 85 and the block 89 on the blocker arm 87 extending upwardly from the clutch shaft 86, which blocker mechanism has already been referred to hereinbefore. The dotted lines show the shift lever in its lower position, in which position the valve is at the lower end of its stroke for connection of the inner end of the power cylinder with vacuum during which position the piston was shifted inwardly in the cylinder for inward shift of the selector elements C and D for coupling engagement with the selected transmission element. The blocking roller 91 on the shift lever is now in front of and in the path of the clutch engaging movement of the clutch pedal and the blocking supporting arm 87, and after the clutch pedal is released for movement in this direction, the valve is moved upwardly, but until the roller is moved upwardly beyond the top of the block 89, the clutch pedal cannot complete its final movement for clutch engagement. In other words, the clutch cannot become engaged until the shift lever has been moved its full distance upwardly by the power cylinder and the shift for the selected speed has been completed. When the shift lever is in its upper position after a shift and the clutch is in engagement, the block 89 will be below the roller 91 so that shifting of the selector elements from their outer to their inner position cannot be accomplished until the clutch pedal is moved in unclutching direction for withdrawal of the block 89 from underneath the shift lever roller.

The provision of the blocker mechanism in the transmission control system is optional, and where this blocker mechanism is not applied, the valving arrangement permits double clutching operation where the transmission is not synchronized. For such double clutching, the clutch pedal is disengaged and the valve moved to its lower position for movement of the selector elements to their inner position to bring the gears into neutral. On the engaging or return stroke of the pedal, the driver can skip the shift into gear by releasing the clutch pedal slightly faster than normally so that during fast upward movement of the valve, the vacuum will not have a chance to operate the power cylinder for shifting. Then, if the shift is to be into a lower speed, the engine may be accelerated and the clutch pedal depressed partially the second time for the shift into gear. For a shift to a higher gear, the engagement of the clutch retards the spinning clutch member after which the gears may be noiselessly engaged by merely depressing the pedal for movement of the valve into vacuum application for shifting. For a shift to a lower gear, the driver performs the same operations with the addition of the acceleration of the engine before gear engagement. For example, suppose that the transmission is at high speed and the driver desires second speed, he preselects through to the second speed without stopping at neutral and then depresses the clutch pedal the full distance for movement of the valve for operation of the power cylinder to bring the gears to neutral. He then releases the clutch abnormally fast for quick movement of the valve through the shifting range for engagement of the clutch with the gears still in neutral. The motor is accelerated to bring the transmission gear into approximately synchronized speed, and then the driver depresses the pedal part way for movement of the valve into shifting range for setting of the valve for operation of the power cylinder to effect the shift to second speed and then engages the clutch. The change from second to first speed can be accomplished by the same procedure, except that instead of accelerating the engine, he engages the clutch to act as a brake to reduce the speed of the third gear to the speed of the second gear and then depresses the clutch lever partially for vacuum supply for shift to third speed.

Detents 131 and 132 are disposed within a cross bore 133 in the casing 1 which intersects the passage through the boss 20 in which is secured the shaft 19 which journals the end of the selector element supporting tube 18. Springs 135 extend between the detents and the shaft 19 and urge the detents outwardly against the bars 8 of the shifter elements A and B, these bars having cross notches 136 in which the detents engage when the shifter elements are in neutral position. A pin 137 extends through and is shiftable in the cross passage 138 in the shaft 19, and the outer ends of the pin are encircled by the detent springs. The pin is of such length that when one of the shifter elements is shifted and its neutral position notch 136 is displaced from the corresponding detent, this detent will be shifted inwardly to abut against the cylindrical surface of the shaft 8 and also abut against the pin to cause the pin to be shifted to lock the other detent in the neutral notch of the other shifter element so that this other shifter element will be locked against movement. Either shifter elements will thus be automatically locked in a neutral position as the other shifter element is moved for gear shift, so that by no possibility can both shifter elements be moved at the same time to render more than one speed active.

Figure 19 shows a modified arrangement for shifter element interlock and also for controlling a signal for indicating to the driver when the shifter elements are in neutral, this being especially useful, for example, when starting the engine. In the modified arrangement, instead of journalling the end of the selector element supporting tube 18 on a shaft 19 extending from the casing as in Figures 1 and 4, the casing could be provided with an inwardly extending lug 139 for journalling the tube. The detent elements 140 and 141 will be located in a cross bore 142 in the casing 1 for engagement with the shifter element shafts 8, the detent elements being urged by a spring 143 outwardly for engagement in the neutral notches 136, the detents being of such length that upon shift of one of the shifter elements the corresponding detent will be cammed out of the corresponding neutral notch and engage with the other detent to hold this detent in the neutral notch of the other shifter element, so that this other shifter element cannot move.

A longitudinally extending bore 144 extends inwardly from the outer end of the casing to communicate with the detent bore 142. In this longitudinal bore there is a plunger 145 having a stem 146. A recess 147 at the outer end of the casing is concentric with the bore 144 and in this recess is mounted a switch structure which comprises a base structure 148 of insulating material secured against the back of the recess by screw 149. The plunger rod 146 extends through the base and is preferably of insulating material. A contact spring 150 is secured at one end by the screw 149 to be connected with the casing 1 and thereby with the grounded side of the battery 151. The outer end of the spring extends across and in front of the outer end of the stem 146 for engagement with a contact post 152 supported by the base 148. This contact post is connected with one terminal of a signal, such as an electric lamp 153 located at the dashboard for observation by the driver, the other terminal of the lamp being connected preferably with the ignition circuit so that the signal circuit is operative only when the ignition circuit is closed.

The detents 140 and 141 are bevelled at their inner ends for engagement by the bevelled or wedge end of the plunger 145. Figure 19 shows the detents in the neutral notches 136, so that the detents are separated a distance for engagement of the wedge end of the plunger with the detent bevelled ends, the plunger being held in this inner position by the spring 154 between the plunger and the switch base, and in this position the plunger stem permits the switch spring 150 to engage with the contact post 152 so that current may flow through the indicating lamp 153 when the ignition switch is closed, the lighted lamp indicating to the driver that the shifter elements are in neutral position. Upon movement of either shifter element from its neutral position, the corresponding detent will be shifted inwardly, and its bevelled inner end will cam the plunger 145 outwardly so that the switch spring 150 will be lifted away from the contact 152 to open the signal circuit, so that the driver will know that the shifter elements are not in neutral position. As soon as the shifter elements are returned to neutral, the detents will permit inward shift of the plunger and return of the switch to circuit closing position for illumination of the indicating lamp 153.

Referring again to the valve structure, a rubber grommet or washer structure 155 is preferably provided for the supporting clip 113 for the valve housing extension link 112, so that the connection of this link with the transmission casing may be yielding and permit twisting or distortion of the transmission casing during operation of the vehicle without disturbing the valve housing adjustment.

During failure of vacuum for the power cylinder, as, for example, in case of a broken vacuum line, the shifting may be accomplished manually by inserting into the socket 94 of the shift lever 85 a hand lever which may be an ordinary metal bar or rod. For driving the vehicle under such conditions, the selection for the desired speed is made and the clutch disengaged, and then the hand lever is swung forwardly for shifting the selector element and the gearing to neutral position and then the lever is swung rearwardly for effecting the shift to the selected gear, the hand lever thus taking the place of the power cylinder. Such shifting by the hand lever may also be accomplished when the engine is not running.

In order to counterbalance the weight of the cylinder piston and parts connected therewith, when the cylinder is open to atmosphere, and to hold the piston in its outer position, a spring 156 may be inserted between the cylinder bottom and the piston, the spring being of just sufficient strength to balance the weight of the piston structure so that it cannot disturb the setting of the shift lever after a shifting movement thereof.

We have shown a simple, practical, and efficient embodiment of the various features of our invention, but we do not desire to be limited to the exact construction, arrangement, and operation shown and described, as changes and modifications may be made without departing from the scope of the invention.

We claim as follows:

1. A gear shifting mechanism including a gear housing, gear shifters in said housing and companion selectors interlocked to be simultaneously rotatable together and shiftable relatively toward or away from each other, coupling means for selectively coupling the selectors to the shifters, means for rotating said selectors for the desired coupling connection, means whereby upon shift of the selectors toward each other said gear shifters will be moved to neutral position and the selected coupling connection will become effective and whereby upon shift of said selectors away from each other the coupled shifter will be shifted to the corresponding "in-gear" position, means for effecting the shifting of the selectors, a disc mounted on the outer end of one of said selectors and having radially extending notches in its peripheral portion circumferentially spaced in accordance with the selection position of said selectors, a locking plate on said housing in the path of said disc, said selectors being free for shifting movement only after complete selection movement thereof to bring the corresponding disc notch into alignment with said locking plate, and said locking plate remaining in a disc notch to prevent selection movement of the selectors until a shift has been fully completed by passage of said disc plate past said locking plate.

2. A gear shifting mechanism including a gear housing, gear shifters in said housing and companion selectors interlocked to be simultaneously rotatable and to be shiftable relatively toward or away from each other, coupling means for selectively coupling the selectors to the shifters, means for rotating said selectors for the desired coupling connection, means whereby upon shift of the selectors toward each other said gear shifters will be moved to neutral position and the selected coupling connection will become effective and whereby upon shift of said selectors away from each other the coupled shifter will be shifted to the corresponding "in-gear" position, means for effecting the shifting of the selectors, one of said selectors having notches circumferentially spaced in accordance with the correct selection positions of said selectors, a locking plate on said housing positioned to align with a notch to permit shifting of the selectors only after said selectors have been set to proper selection position, but to remain in a notch to prevent selection movement of the selectors unless said selectors have been fully shifted to shift position.

3. In an automotive vehicle, a transmission, a shift lever connected to said transmission for shift thereof into neutral or into gear, a clutch and an operating shaft therefore, a pedal connected for operating said clutch shaft, an arm on said clutch shaft having an abutment block thereon, an abument pin on said shift lever, said abutment block being in the path of said pin when the clutch is engaged whereby said shift lever will be held against shift operation until said clutch is disengaged and said block withdrawn from the path of said pin, said pin after a shift movement in one direction of said shift lever being in the path of said block while the clutch is disengaged whereby said clutch will be prevented from re-engagement until said shift lever has been restored to its normal position for withdrawal of said pin from the path of said block.

4. In an automotive vehicle, a transmission, a shift lever connected with the transmission for shift thereof into neutral or into gear, operating means for said shift lever, said shift lever being normally in "in-gear" position, a clutch and an operating shaft therefor, a pedal connected with said clutch shaft for operation thereof, an arm extending from said clutch shaft and having an abutment block thereon, an abutment pin on said shift lever, said abutment block being in the path of said abutment pin when said clutch is engaged whereby said operating means is prevented from moving said shift lever to gear neutralizing position until the clutch is disengaged and said block is removed from the path of said pin, said pin, when the clutch is disengaged, being in the path of said abutment block whereby said clutch is prevented from becoming re-engaged until said operating means has returned said shift lever to its "in-gear" position.

RALPH F. PEO.
HARRY L. CHISHOLM, Jr.
DOUGLAS F. LINSLEY.